Aug. 5, 1952     R. G. LE TOURNEAU     2,605,819
BUCKET SEAT
Filed April 18, 1950
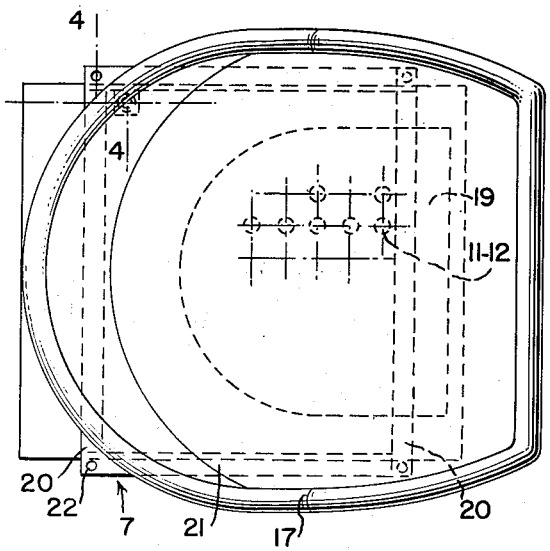
FIG.I.
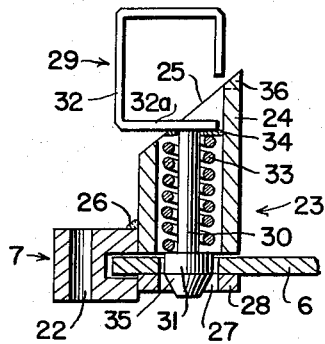
FIG.4.
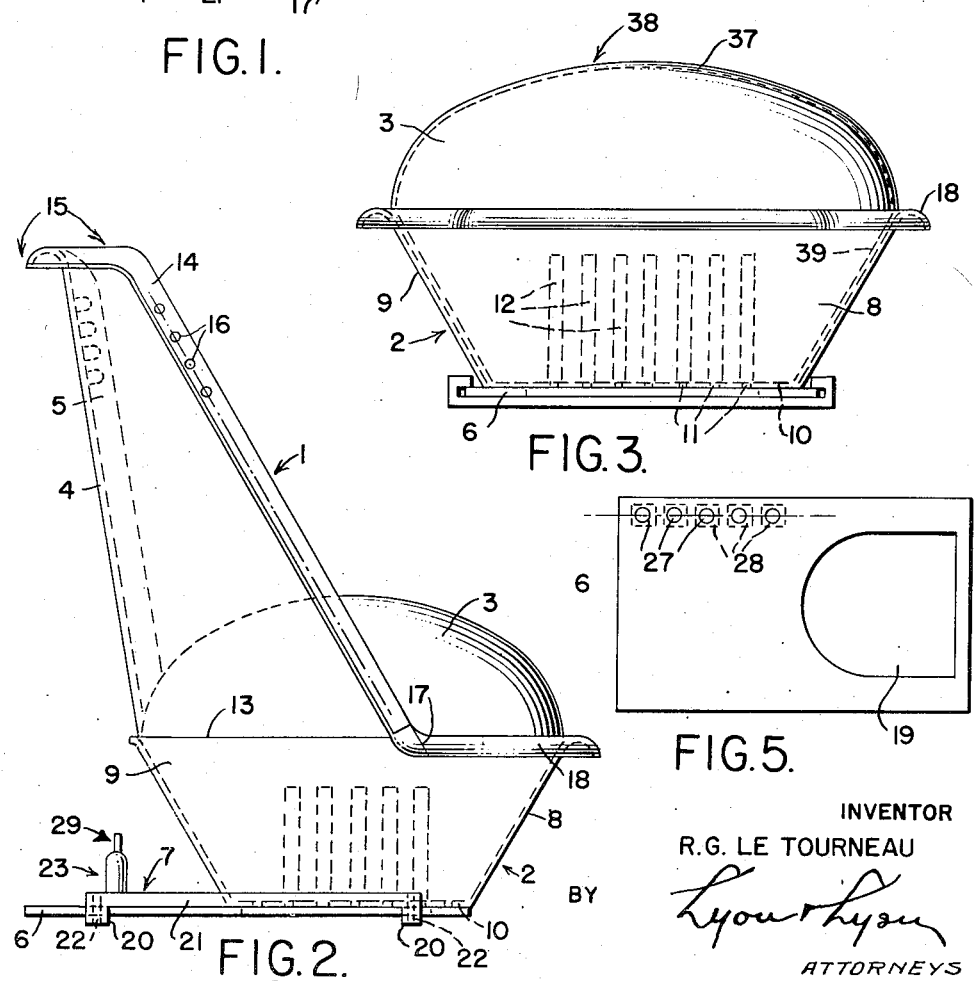
FIG.3.
FIG.2.
FIG.5.
INVENTOR
R.G. LE TOURNEAU
BY
*Lyon & Lyon*
ATTORNEYS Patented Aug. 5, 1952

2,605,819

UNITED STATES PATENT OFFICE 2,605,819

BUCKET SEAT

Robert G. Le Tourneau, Longview, Tex.

Application April 18, 1950, Serial No. 156,609

5 Claims. (Cl. 155—179)

This invention relates generally to cushioned seats for vehicles, and more particularly to the type known as "bucket" seats.

The primary object is to provide a seat in which "foam rubber" provides the entire seat portion and cushioning therefor.

A further object is to provide a seat which includes a tapered retainer so that as the top of the foam rubber is compressed the resistance to further compression increases.

Another object is to provide a retainer of this type which includes a perforated bottom so that the foam rubber which is sealed on the top and sides may "breathe" through the retainer bottom.

Another object is to provide a foam rubber seat cushion which includes tapered sides and an enlarged crown type seat portion.

A further object is to provide a foam rubber seat cushion which is coated on all sides except the bottom so that the area for escaping air is limited and the entrapped air is partially compressed to provide an additional cushioning effect.

Another object is to provide a unique, simple, and sturdy structure for a seat adjustment mechanism.

These and other objects will be apparent from the following specification and drawing in which:

Fig. 1 represents a top plan view of the metal seat with a foam rubber cushion installed.

Fig. 2 represents a side view of the seat and cushion.

Fig. 3 represents a front elevation of the retainer portion of the seat with the cushion installed.

Fig. 4 represents the locking means to permit adjustment of the seat in a longitudinal direction, in section along line 4—4 of Fig. 1.

Fig. 5 is a detail view of the bottom plate for the seat.

In the drawings, the complete seat represented at 1 is seen to include a metal cushion retainer 2 in which a foam rubber cushion 3 resides, a tilted seat back 4 of sheet metal, a foam rubber back rest pad 5, a bottom plate 6, and a mounting frame 7.

The cushion retainer 2 is cup shaped and has an inclined front wall 8, and an inclined horseshoe-shaped combination side and rear wall 9 which completes the enclosure for cushion 3. The walls are attached to a perforated bottom 10 which provides a resting base for the cushion 3. The perforations 11 in bottom 10 are aligned with bores 12 drilled partially thru cushion 3 to provide breathing action for the cushion.

The retainer 2 is joined by welding or other means to seat back 4 at 13 to form a unitary seat. Back 4 is fitted with a foam rubber pad 5 which is curved to fit back 4. This pad is glued to a leather cover 14 which attaches to the curved outer edge 15 of back 4 by riveting thereto, as at 16. The curved edge 15 is welded as at 17 to curved edge 18 of retainer 2.

The unitary seat thus formed by joining back 4 and retainer 2 is welded to bottom plate 6. Plate 6 includes a large opening 19 which permits passage of air thru bores 12 of the cushion and perforations 11 of bottom 10 and out into the atmosphere.

The plate 6 is then inserted in guided alignment between cross arms 20 and longitudinal arms 21 of mounting frame 7. Mounting frame 7 includes four mounting holes 22 to permit attachment by bolting or other means to a vehicle. To permit adjustment of the seat to suit the physical condition of different occupants, the mounting frame 7 is provided with a spring latch unit indicated generally at 23. This unit comprises a tube 24 cut with an upper tapered edge 25 and welded as at 26 to frame 7. Plate 6 includes a series of longitudinally aligned holes 27 which are reinforced by bosses 28 at the underside. A pin 29 including a shank 30, an enlarged head 31 and a finger grip 32 is inserted in tube 24. A spring 33 seats against an internal shoulder 34 of tube 24 and exerts a pressure on head 31 to keep pin 29 engaged in one of holes 27. When finger grip 32 is raised, spring 33 is compressed and head 31 is raised out of hole 29, so that plate 6 may be moved with the seat by the operator until the desired position is reached, at which time pin 29 is released into the selected hole 27 and the seat is temporarily locked in the selected position. A bevelled surface 35 on head 31 permits easy insertion in the desired hole 27. If the seat is to be moved by several holes before pin 29 is reinserted, the finger grip 32 is raised and revolved 180° and the lower leg 32 is raised and inserted in groove 36 near the top point of surface 25 so that the pin 29 is held out of engagement with hole 27 until the selected position is reached.

Cushion 3 is covered on all sides except the bottom with a neoprene coating, indicated at 37, so that air tending to be compressed within the foam rubber cushion 2 may escape thru the bottom only. The cushion 3 is of single piece construction having a crown top 38, and tapered sides 39 which correspond to the walls 8 and 9 of seat retainer 2.

The advantages of this seat as installed on a vehicle are in addition to being of simple construction, that it is readily adjustable, durable, comfortable, has no exposed edges, and cushioning springs as usually required in a seat of this type are dispensed with.

From the foregoing description it will be readily seen that there has been produced such a device as substantially fulfills the objects of the invention as set forth herein.

While the specification sets forth in detail the present and preferred construction of this mechanism, still in practice such deviations from such detail may be resorted to as do not form a departure from the spirit of the invention as defined by the appended claims.

Having thus described the invention, the following is claimed as new and useful and upon which Letters Patent are desired:

1. A device of the class described comprising, a seat, a plate attached to the bottom of said seat and having longitudinally aligned holes therein, mounting means for attaching said seat to said vehicle in longitudinally adjustable relation, comprising: a mounting frame including longitudinal arms overlying said plate, cross arms attached to said longitudinal arms and underlying said plate, means associated with said frame for locking said frame and plate in selected positions, said second means comprising an upstanding tube with a tapered upper edge on said frame, a pin with an enlarged and bevelled head at its lower end inserted in said tube, spring means within said tube urging said pin downward, said pin engaging one of said bottom plate holes under the action of said spring when said tube and hole are in alignment.

2. A device of the class described comprising, a seat, a plate attached to the bottom of said seat and having longitudinally aligned holes therein, mounting means for attaching said seat to said vehicle in longitudinally adjustable relation, comprising: a mounting frame including longitudinal arms overlying said plate, cross arms attached to said longitudinal arms and underlying said plate, means associated with said frame for locking said frame and plate in selected positions, said second means comprising an upstanding tube with a tapered upper edge on said frame, a pin with an enlarged and bevelled head at its lower end inserted in said tube, spring means within said tube urging said pin downward, said pin engaging one of said bottom plate holes under the action of said spring when said tube and hole are in alignment, and a groove in the upper surface of said tapered edge to retain said pin out of engagement with said hole when so desired.

3. A seat comprising a cushion retainer in the form of a relatively deep cup having downwardly converging side walls and a bottom wall; a cushion comprising a resilient cellular mass having side walls shaped complementary to the inside of said cup and removably positioned therein with the side walls of said cushion in snug surface engagement with all the side walls of said cup and with the entire bottom surface of said cushion within said cup and overlying said bottom wall; said cushion having generally vertically extending openings through the bottom surface thereof and having an air-impervious coating covering its entire outer surface except for said bottom surface.

4. A seat as defined in claim 3 wherein said cushion is provided with an upwardly crowned top portion extending a substantial distance above the top of said cup but entirely within the horizontal projection of the upper rim of said side walls.

5. A seat as defined in claim 3 wherein said cup is a rigid structure and wherein the side walls and bottom thereof are of air-impervious material, said bottom wall having a plurality of holes therethrough aligned with said vertically extending openings in said cushion.

ROBERT G. LE TOURNEAU.

REFERENCES CITED

The following references are of record in the file of this patent:

UNITED STATES PATENTS

| Number | Name | Date |
|---|---|---|
| 701,238 | Williams | May 27, 1902 |
| 1,700,308 | Chilson et al. | Jan. 29, 1929 |
| 1,853,617 | Hutchcroft | Apr. 12, 1932 |
| 1,961,653 | Van Deest | June 5, 1934 |
| 2,159,520 | Chapman | May 23, 1939 |
| 2,208,745 | Bloomberg | July 23, 1940 |
| 2,248,413 | Rathbun | July 8, 1941 |